United States Patent
Ito et al.

(10) Patent No.: US 8,534,111 B2
(45) Date of Patent: Sep. 17, 2013

(54) METHOD FOR SHAPING ELECTRIC WIRE END AND MOLD FOR SHAPING ELECTRIC WIRE END

(75) Inventors: Naoki Ito, Makinohara (JP); Fumie Hino, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/806,918

(22) PCT Filed: Aug. 25, 2011

(86) PCT No.: PCT/JP2011/069853
§ 371 (c)(1),
(2), (4) Date: Dec. 26, 2012

(87) PCT Pub. No.: WO2012/026616
PCT Pub. Date: Mar. 1, 2012

(65) Prior Publication Data
US 2013/0098134 A1  Apr. 25, 2013

(30) Foreign Application Priority Data
Aug. 25, 2010 (JP) ................................. 2010-188558

(51) Int. Cl.
H01R 43/02  (2006.01)
H01R 43/048  (2006.01)

(52) U.S. Cl.
USPC ......... 72/416; 72/409.14; 72/409.16; 72/712; 29/751; 29/753; 29/863

(58) Field of Classification Search
USPC ............... 72/409.14, 409.16, 416, 453.16, 72/712; 29/751, 753, 758, 761, 861, 863
See application file for complete search history.

(56) References Cited

U.S. PATENT DOCUMENTS

| | | | |
|---|---|---|---|
| 2,151,032 A | * | 3/1939 | Jensen ............................ 29/869 |
| 3,101,766 A | * | 8/1963 | Floyd, Jr. ........................ 72/472 |

(Continued)

FOREIGN PATENT DOCUMENTS

| | | |
|---|---|---|
| DE | 3806544 A1 | 9/1989 |
| DE | 19636217 A1 | 3/1998 |

(Continued)

OTHER PUBLICATIONS

International Search Report (PCT/ISA/210) dated Nov. 11, 2011 issued by the International Searching Authority in counterpart International Application No. PCT/JP2011/069853.

(Continued)

*Primary Examiner* — David B Jones
(74) *Attorney, Agent, or Firm* — Sughrue Mion, PLLC

(57) ABSTRACT

To provide a method for shaping an electric wire end and a mold for shaping electric wire end, capable of shaping a distal end with a rectangular shape in sectional view by smoothly pressing conductors of plural electric wires without causing a reduction in strength.

In a shaping method of an electric wire end, in which conductors 23 of electric wires stacked mutually are compressed from the stack direction and a distal end 31 with a rectangular shape in sectional view is shaped, by a lower metallic mold 12 and an upper metallic mold 13 provided with shaping grooves 14, 15 having corner portions 14b, 15b for shaping angular portions 31b of the distal end 31, the conductors 23 of the electric wires stacked are compressed from the stack direction and the distal end 31 with the rectangular shape in sectional view in which each of the angular portions 31b is shaped by the corner portions 14b, 15b of the lower metallic mold 12 and the upper metallic mold 13 and corner portions 11a formed at a boundary between the lower metallic mold 12 and the upper metallic mold 13 is shaped.

2 Claims, 5 Drawing Sheets

(56) References Cited

U.S. PATENT DOCUMENTS

| | | | | |
|---|---|---|---|---|
| 3,146,519 A | * | 9/1964 | Redwine | 29/862 |
| 3,216,091 A | * | 11/1965 | Floyd, Jr. | 29/863 |
| 4,365,501 A | * | 12/1982 | Potts | 72/416 |
| 4,445,358 A | * | 5/1984 | Gooding | 72/416 |
| 4,890,384 A | * | 1/1990 | Shaffer | 29/863 |
| 5,163,221 A | | 11/1992 | Favre-Tissot et al. | |
| 5,692,294 A | * | 12/1997 | Casey | 72/416 |
| 2004/0088857 A1 | | 5/2004 | Fujimoto | |
| 2006/0169742 A1 | | 8/2006 | Fujimoto et al. | |

FOREIGN PATENT DOCUMENTS

| | | | |
|---|---|---|---|
| DE | 10340284 A1 | 3/2004 | |
| DE | 102005059676 A1 | 7/2006 | |
| EP | 0467798 A1 | 1/1992 | |
| JP | 4-248283 A | 9/1992 | |
| JP | 2000-149755 A | 5/2000 | |
| JP | 2004-95293 A | 3/2004 | |
| JP | 2006-172927 A | 6/2006 | |
| JP | 2009-21176 A | 1/2009 | |
| WO | 2010/058786 A1 | 5/2010 | |

OTHER PUBLICATIONS

Written Opinion (PCT/ISA/237) of the International Searching Authority dated Nov. 11, 2011 in counterpart International Application No. PCT/JP2011/069853.

* cited by examiner

METHOD FOR SHAPING ELECTRIC WIRE END AND MOLD FOR SHAPING ELECTRIC WIRE END

TECHNICAL FIELD

The present invention relates to a method for shaping an electric wire end and a mold for shaping electric wire end, in which conductors of plural electric wires are shaped into a distal end with a rectangular cross section.

BACKGROUND ART

For example, in an ultrasonic bonding method for bonding a conductor of an electric wire to a terminal by ultrasonic vibration while applying pressure by a pressurization and vibration horn, the conductor of the electric wire is shaped into a rectangular shape in sectional view (for example, see PTL 1 to 5).

Figure 8:
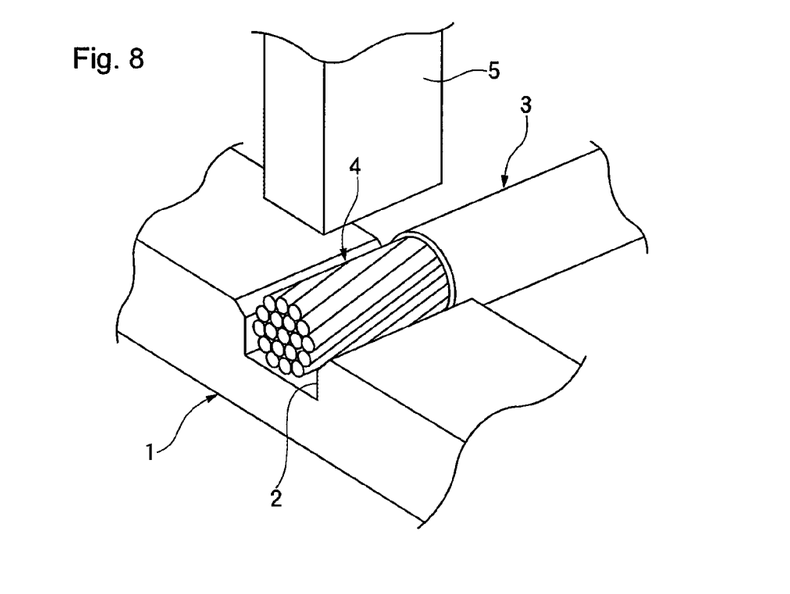
FIG. 8 is a perspective view showing a conventional example of a shaping method of a conductor.

In the case of shaping a conductor of an electric wire into a rectangular shape in sectional view, as shown in FIG. 8, a conductor 4 of an electric wire 3 is arranged in a recessed groove portion 2 formed in a lower mold 1 and in this state, the conductor 4 of the inside of the groove portion 2 is pressed by an upper mold 5. Consequently, the conductor 4 of the electric wire 3 is pressurized by the lower mold 1 and the upper mold 5 and is shaped in a predetermined rectangular shape in sectional view.

CITATION LIST

Patent Literature

[PTL 1] JP-A-4-248283
[PTL 2] JP-A-2000-149755
[PTL 3] JP-A-2004-95293
[PTL 4] JP-A-2006-172927
[PTL 5] JP-A-2009-21176

SUMMARY OF INVENTION

Technical Problem

Figure 9:
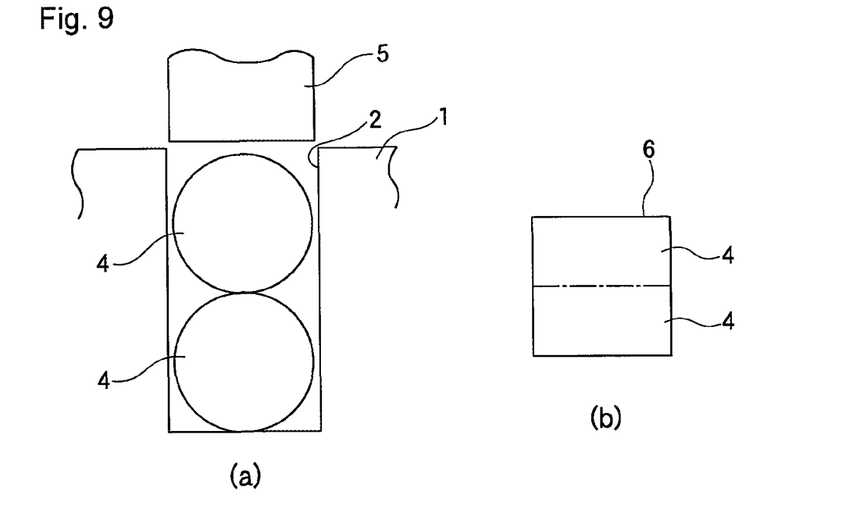
FIG. 9(a) is a front view before shaping.
FIG. 9(b) is a front view of a distal end shaped.
Figure 10:
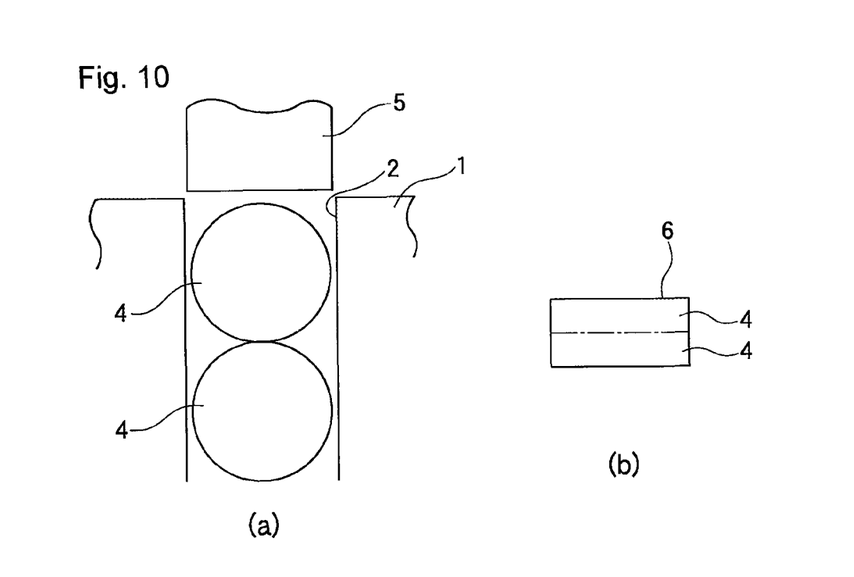
FIG. 10(a) is a front view before shaping.
FIG. 10(b) is a front view of a distal end shaped.

Incidentally, for two electric wires 3 bonded to a terminal, the conductors 4 of each of the electric wires 3 are stacked and pressed and shaped into a rectangular shape in sectional view as described above. For example, when conductors 4 of two electric wires 3 with a radius of 1 mm are pressed from a stack direction as shown in FIG. 9(*a*) and a connecting terminal portion 6 with a square shape having a width of 2 mm and a height of 2 mm in sectional view is shaped as shown in FIG. 9(*b*), a dimension of a compression direction is compressed from 4 mm to 2 mm (one-half) and its compressibility ratio becomes 50%. Also, when conductors 4 of two electric wires 3 with a radius of 1 mm are pressed from a stack direction as shown in FIG. 10(*a*) and a connecting terminal portion 6 with an oblong shape having a width of 2 mm and a height of 1 mm in sectional view is shaped as shown in FIG. 10(*b*), a dimension of a compression direction is compressed from 4 mm to 1 mm (one-fourth) and its compressibility ratio becomes 75%.

When the compressibility ratio is high, there is possibility in that the center of the shaped conductor 4 crushes excessively and a high load is imposed on the center and the conductor 4 may suffer damage and cause a reduction in strength.

The present invention has been implemented in view of the circumstances and possibility, and it is an object of the present invention to provide a method for shaping an electric wire end and a mold for shaping an electric wire end, capable of shaping a distal end with a rectangular shape in sectional view by smoothly pressing conductors of plural electric wires without causing a reduction in strength.

Solution to Problem

To achieve the object, according to a first aspect of the present invention, there is provided a method for shaping an electric wire end in which conductors of electric wires stacked mutually are compressed from a stack direction such that a distal end with a rectangular shape in sectional view is shaped, the method comprising compressing the conductors of the electric wires stacked from the stack direction by a pair of molds provided with shaping grooves having corner portions for shaping angular portions of the distal end; wherein the angular portions of the distal end with the rectangular shape in the sectional view is shaped by the corner portions of the molds and corner portions to be formed at a boundary between the molds.

In the first aspect of the present invention, the distal end with the rectangular shape in sectional view can be shaped by pressing the plural conductors while extremely reducing a compressibility ratio. Hence, a compressive force applied to the conductors can be equalized and damage to the conductors is minimized and a reduction in strength can be prevented.

Also, to achieve the object, according to a second aspect of the present invention, there is provided a mold for shaping electric wire end, a mold for shaping an electric wire end in which conductors of electric wires stacked mutually are compressed from the stack direction and a distal end with a rectangular shape in sectional view is shaped, the mold comprising a pair of molds provided with shaping grooves having corner portions for shaping angular portions of the distal end; wherein corner portions are formed by edges of the shaping grooves by mutually butting the respective molds such that the shaping grooves are aligned.

In the second aspect of the present invention, the distal end with the rectangular shape in sectional view can be shaped by pressing the plural conductors while extremely reducing a compressibility ratio. Hence, a compressive force applied to the conductors can be equalized and damage to the conductors is minimized and a reduction in strength can be prevented.

Advantageous Effects of Invention

According to the present invention, the method for shaping the electric wire end and the mold for shaping electric wire end, capable of shaping the distal end with the rectangular shape in sectional view by smoothly pressing the conductors of the plural electric wires without causing the reduction in strength can be provided.

The present invention has been described above briefly. Further, details of the present invention will become more apparent by reading through a mode for carrying out the present invention described below with reference to the accompanying drawings.

BRIEF DESCRIPTION OF THE DRAWINGS

FIGS. 9(a) and 9(b) are views describing the case of shaping conductors of two electric wires by a conventional shaping method, in particular.

FIGS. 10(a) and 10(b) are views describing the case of shaping conductors of two electric wires by a conventional shaping method, in particular.

DESCRIPTION OF EMBODIMENTS

An example of an embodiment according to the present invention will hereinafter be described with reference to the drawings.

Figure 1:
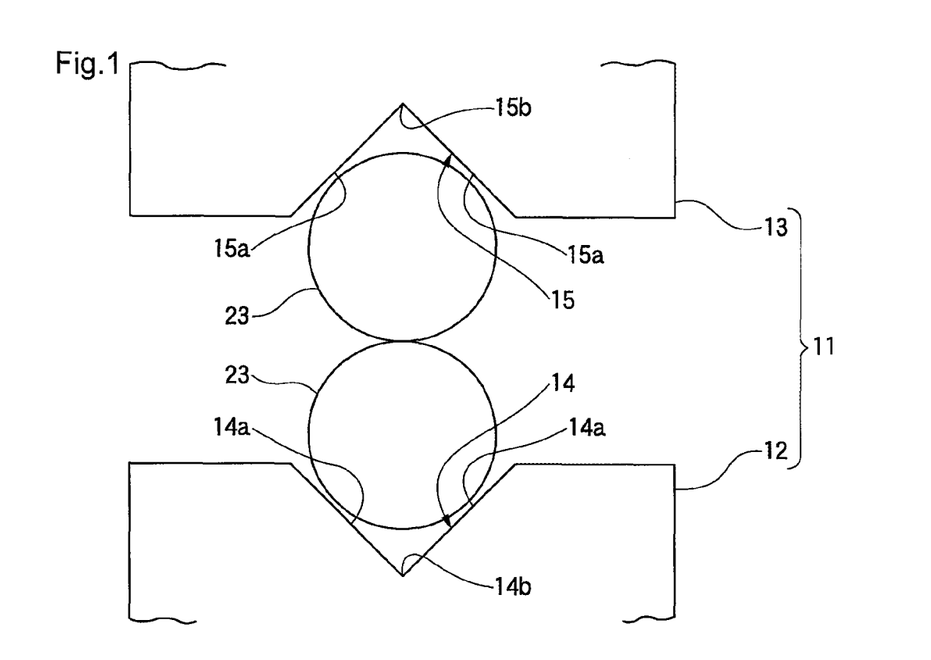
FIG. 1 is a front view of a mold for shaping electric wire end according to an embodiment of the present invention.
Figure 2:
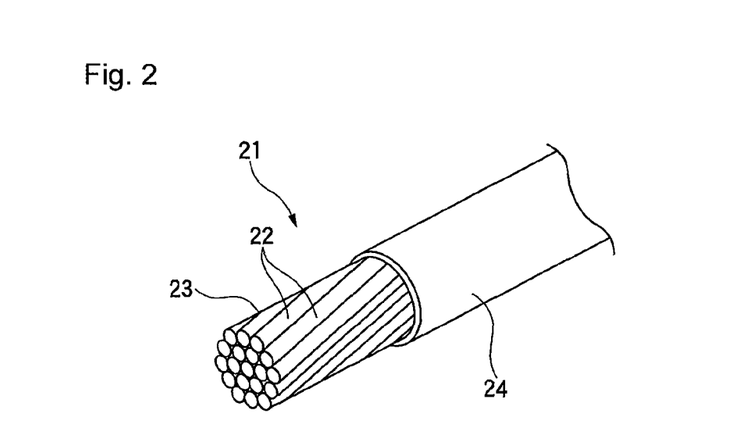
FIG. 2 is a perspective view of an electric wire end targeted for shaping.
Figure 3:
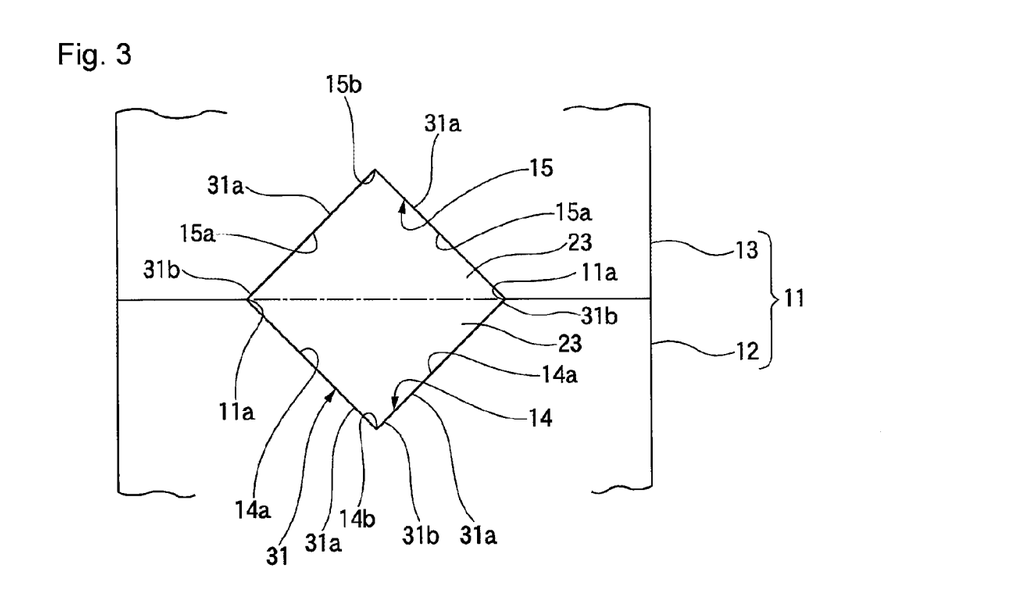
FIG. 3 is a front view showing a state of shaping conductors of electric wires by the mold for shaping electric wire end.
Figure 4:
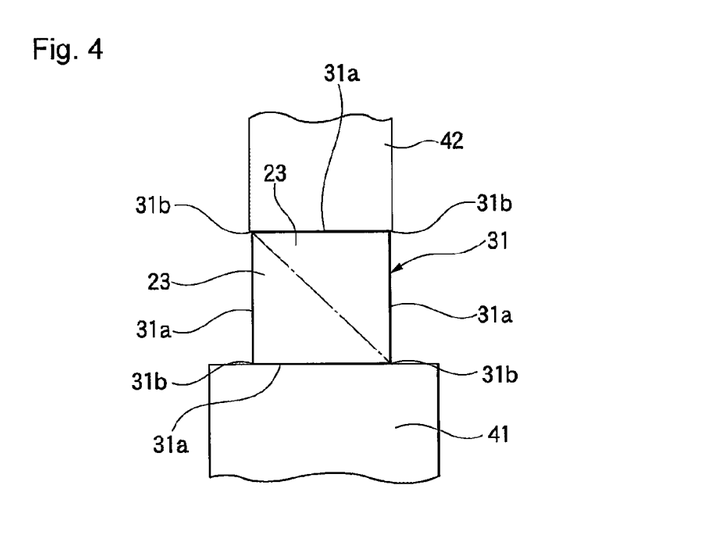
FIG. 4 is a front view showing a method of connection of a distal end shaped by pressing the conductors of the electric wires.

FIG. 1 is a front view of a mold for shaping electric wire end according to an embodiment of the present invention, and FIG. 2 is a perspective view of an electric wire end targeted for shaping, and FIG. 3 is a front view showing a state of shaping conductors of electric wires by the mold for shaping electric wire end, and FIG. 4 is a front view showing a method of connection of a distal end shaped by pressing the conductors of the electric wires.

As shown in FIG. 1, a mold 11 for shaping an electric wire end includes a lower metallic mold (mold) 12 and an upper metallic mold (mold) 13.

As shown in FIG. 2, an electric wire 21 whose end is shaped by the mold 11 for shaping the electric wire end has a conductor 23 in which plural strands 22 are twisted, and this conductor 23 is covered with an outer coat 24. The conductor 23 is formed of a metal material such as aluminum or aluminum alloy. Also, the outer coat 24 is formed of a synthetic resin material such as polypropylene (PP) resin.

As shown in FIG. 3, the mold 11 for shaping electric wire end is a mold for shaping a distal end 31 with a square shape in sectional view (a rectangular shape in sectional view) by mutually stacking the conductors 23 of the two electric wires 21 and compressing the conductors 23 from the stack direction.

Shaping grooves 14, 15 are respectively formed in the lower metallic mold 12 and the upper metallic mold 13 constructing the mold 11 for shaping electric wire end. These shaping grooves 14, 15 have flat surface portions 14a, 15a for forming surfaces 31a of the distal end 31, and corner portions 14b, 15b for shaping angular portions 31b of the distal end 31.

When a radius of the conductor 23 of the electric wire 21 is set at 1 mm herein, length dimensions of the flat surface portions 14a, 15a are set at 2 mm and also both angles of the corner portions 14b, 15b are set at 90°.

In the case of forming the distal end 31 by integrating the conductors 23 of the two electric wires 21 by the mold 11 for shaping electric wire end, the conductors 23 of the electric wires 21 exposed by removing the outer coats 24 in the ends are arranged between the lower metallic mold 12 and the upper metallic mold 13 in a state of mutually stacking the conductors 23 (see FIG. 1).

In this state, the conductors 23 of the electric wires 21 are compressed from the stack direction by the lower metallic mold 12 and the upper metallic mold 13.

Then, the conductors 23 of the electric wires 21 are pressed inside the shaping grooves 14, 15 of the lower metallic mold 12 and the upper metallic mold 13, and the distal end 31 is shaped.

In this distal end 31, right-angled angular portions 31b are formed in opposed positions by the corner portions 14b, 15b of the shaping grooves 14, 15 and also right-angled angular portions 31b are formed in opposed positions by corner portions 11a formed at a boundary between the lower metallic mold 12 and the upper metallic mold 13. Then, the surfaces 31a are formed between these angular portions 31b. That is, the distal end 31 is shaped in a square shape in sectional view, having the four angular portions 31b.

In the distal end 31 formed thus, a length of each side becomes 2 mm in sectional view when a radius of the conductor 23 is set at 1 mm, so that a length of a diagonal line becomes about 2.83 mm.

Therefore, when the conductors 23 of the two electric wires 21 are pressed by the mold 11 for shaping electric wire end, a dimension of the conductors 23 in the stack direction changes from 4 mm to 2.83 mm and is compressed to about 70.75% with respect to the original dimension. That is, a compressibility ratio by this mold 11 for shaping electric wire end becomes about 29.25%.

According to the embodiment thus, the distal end 31 with the square shape in sectional view which is the rectangular shape in sectional view can be shaped by pressing the two conductors 23 while extremely reducing the compressibility ratio. Hence, a compressive force applied to the conductors 23 can be equalized and damage to the conductors 23 is minimized and a reduction in strength can be prevented.

Then, in the case of bonding the distal end 31 shaped as described above by an ultrasonic bonding method, the distal end 31 is rotated 45° and the surface 31a is arranged on an anvil 41 as shown in FIG. 4. In this state, while pressurizing an ultrasonic horn 42 positioned in the side opposite to the anvil 41 with the distal end 31 sandwiched between the anvil 41 and the ultrasonic horn 42, ultrasonic vibration is produced by this ultrasonic horn 42.

Consequently, the ends of the two electric wires 21 are bonded at the distal end 31 by the ultrasonic vibration.

Next, another embodiment will be described.

In addition, explanation is omitted by assigning the same numerals to the same structural portions as those of the embodiment described above.

Figure 5:
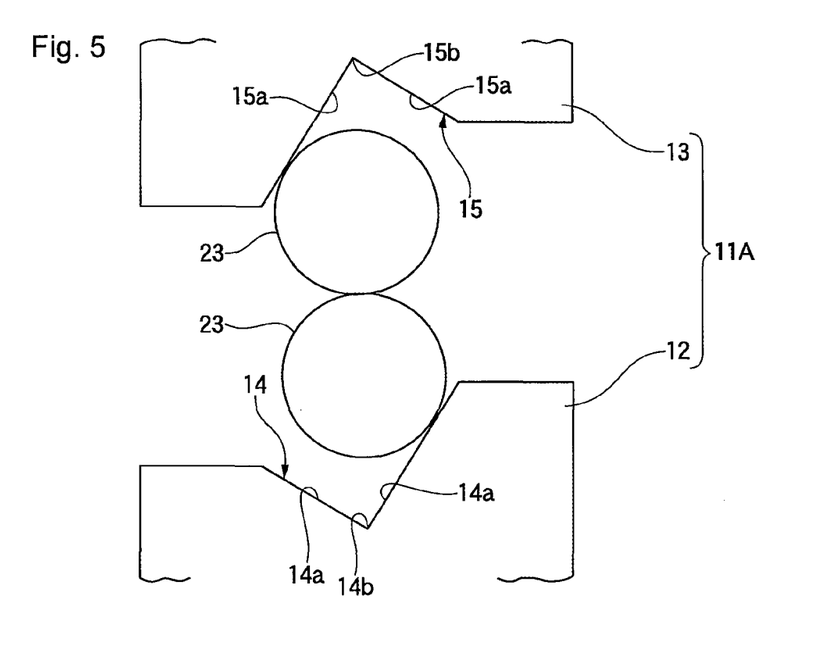
FIG. 5 is a front view of a mold for shaping electric wire end according to another embodiment of the present invention.
Figure 6:
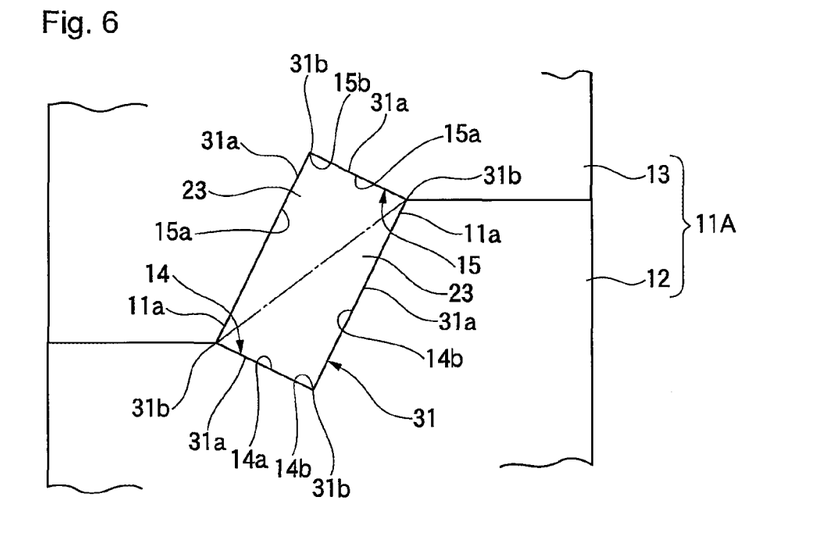
FIG. 6 is a front view showing a state of shaping conductors of electric wires by the mold for shaping the electric wire end.

FIG. 5 is a front view of a mold for shaping electric wire end according to another embodiment of the present invention, and FIG. 6 is a front view showing a state of shaping conductors of electric wires by the mold for shaping electric wire end.

As shown in FIG. 5, in a mold 11A for shaping electric wire end according to another embodiment, a butted position of edges of a shaping groove 14 of a lower metallic mold 12 and a shaping groove 15 of an upper metallic mold 13 is shifted. Consequently, respective lengths of flat surface portions 14a are varied in the shaping groove 14 and also respective lengths of flat surface portions 15a are varied in the shaping groove 15. Concretely, when a radius of a conductor 23 is set at 1 mm, in the shaping groove 14, a length of one flat surface portion 14a is set at 1 mm and a length of the other flat surface portion 14a is set at 2 mm. Similarly, in the shaping groove 15, a length of one flat surface portion 15a is set at 1 mm and a length of the other flat surface portion 15a is set at 2 mm.

As shown in FIG. 6, in the case of forming a distal end 31 by integrating the conductors 23 of two electric wires 21 by the mold 11A for shaping electric wire end, the conductors 23 of the electric wires 21 exposed by removing outer coats 24 in the ends are arranged between the lower metallic mold 12 and the upper metallic mold 13 in a state of mutually stacking the conductors 23 (see FIG. 5).

In this state, the conductors 23 of the electric wires 21 are compressed from the stack direction by the lower metallic mold 12 and the upper metallic mold 13.

Then, the conductors 23 of the electric wires 21 are pressed inside the shaping grooves 14, 15 of the lower metallic mold 12 and the upper metallic mold 13, and the distal end 31 is shaped.

In this distal end 31, right-angled angular portions 31b are formed in opposed positions by corner portions 14b, 15b of the shaping grooves 14, 15 and also right-angled angular portions 31b are formed in opposed positions by corner portions 11a formed at a boundary between the lower metallic mold 12 and the upper metallic mold 13. Then, surfaces 31a are formed between these angular portions 31b. That is, the distal end 31 is shaped in an oblong shape in sectional view (a rectangular shape in sectional view), having the four angular portions 31b.

In the distal end 31 shaped thus, a length of a long side becomes 2 mm and a length of a short side becomes 1 mm in sectional view when a radius of the conductor 23 is set at 1 mm, so that a length of a diagonal line becomes about 2.236 mm.

Therefore, when the conductors 23 of the two electric wires 21 are pressed by the mold 11A for shaping the electric wire end, a dimension of the conductors 23 in the stack direction changes from 4 mm to 2.236 mm and is compressed to about 55.9% with respect to the original dimension. That is, a compressibility ratio by this mold 11A for shaping electric wire end becomes about 44.1%.

Also in the case of another embodiment described above thus, the distal end 31 with the oblong shape in sectional view which is the rectangular shape in sectional view can be shaped by pressing the two conductors 23 while extremely reducing the compressibility ratio. Hence, a compressive force applied to the conductors 23 can be equalized and damage to the conductors 23 is minimized and a reduction in strength can be prevented.

Then, in the case of bonding the distal end 31 shaped as described above by an ultrasonic bonding method, the distal end 31 is rotated properly and the surface 31a is arranged on an anvil 41 as described with reference to FIG. 4. In this state, while pressurizing an ultrasonic horn 42 from the side opposite to the anvil 41, ultrasonic vibration is produced by this ultrasonic horn 42.

Figure 7:
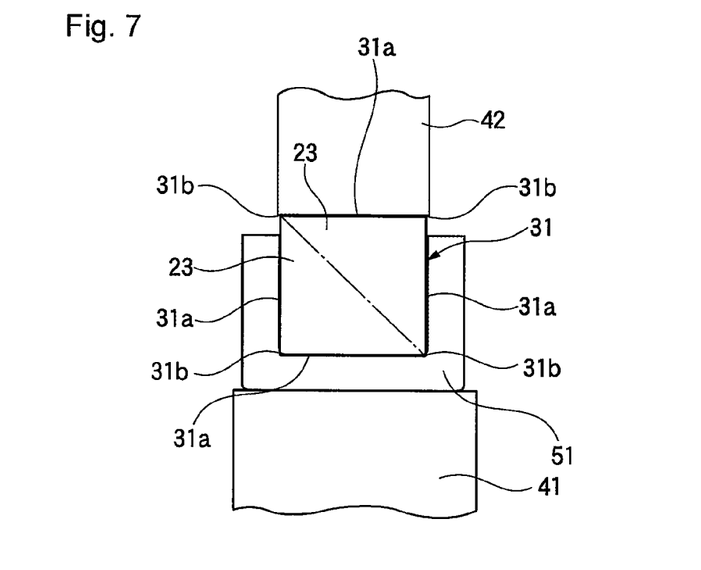
FIG. 7 is a front view showing a method of connection between a terminal and a distal end shaped by pressing conductors of electric wires.

The case of shaping the conductors 23 of the two electric wires 21 by press and shaping the distal end 31 and then bonding the distal end 31 by the ultrasonic bonding method and connecting the conductors 23 has been described up to here. Further, the case of shaping the conductors 23 of the two electric wires 21 by press and shaping the distal end 31 and then bonding the distal end 31 and a terminal by a terminal ultrasonic bonding method and connecting the conductors 23 and also connecting the conductors 23 to the terminal will hereinafter be described. FIG. 7 is a front view showing a method of connection between a terminal and a distal end shaped by pressing conductors of electric wires. In addition, a process of shaping the conductors 23 of the two electric wires 21 by press and shaping the distal end 31 is described with reference to FIGS. 1 and 3 or FIGS. 5 and 6, so that the explanation is omitted.

In the case of bonding a terminal 51 and the distal end 31 described with reference to FIGS. 1 and 3 by an ultrasonic bonding method, the distal end 31 is rotated 45° and the surface 31a is placed on an upper surface of the terminal 51 as shown in FIG. 7. Further, the terminal 51 on which the distal end 31 is placed is arranged on an anvil 41. In this state, while pressurizing an ultrasonic horn 42 positioned in the side opposite to the anvil 41 with the distal end 31 and the terminal 51 sandwiched between the anvil 41 and the ultrasonic horn 42, ultrasonic vibration is produced by this ultrasonic horn 42.

Consequently, by the ultrasonic vibration, the ends of the two electric wires 21 are bonded at the distal end 31 and also the distal end 31 is bonded to the terminal 51.

In addition, the present invention is not limited to the embodiments described above, and modifications, improvements, etc. can be made properly. Moreover, as long as the present invention can be achieved, the number of components, materials, shapes, dimensions, arrangement places, etc. of each of the components in the embodiments described above are arbitrary and are not limited.

This application is based upon and claims the benefit of priority of Japanese Patent Application No. 2010-188558 filed on Aug. 25, 2010, the contents of which are incorporated herein by reference.

INDUSTRIAL APPLICABILITY

According to the present invention, the shaping method of the electric wire end and the mold for shaping electric wire end, capable of shaping the distal end with the rectangular shape in sectional view by smoothly pressing the conductors of the plural electric wires without causing the reduction in strength can be provided.

REFERENCE SIGN LIST 11,11A MOLD FOR SHAPING ELECTRIC WIRE END
11a CORNER PORTION
12 LOWER METALLIC MOLD (MOLD)
13 UPPER METALLIC MOLD (MOLD)
14,15 SHAPING GROOVE
14b,15b CORNER PORTION
21 ELECTRIC WIRE
23 CONDUCTOR
31 DISTAL END
31b ANGULAR PORTION

The invention claimed is:

1. A method for shaping an electric wire end in which conductors of electric wires stacked mutually are compressed from a stack direction such that a distal end with a rectangular shape in sectional view is shaped, the method comprising:
compressing the conductors of the electric wires stacked from the stack direction by a pair of molds including a lower metallic mold and an upper metallic mold and provided with shaping grooves having corner portions for shaping angular portions of the distal end;
wherein the angular portions of the distal end with the rectangular shape in the sectional view is shaped by the corner portions of the molds and corner portions to be formed at a boundary between the molds;

wherein a butted position of edges of the shaping groove of the lower metallic mold and the shaping groove of the upper metallic mold is shifted.

2. A mold for shaping an electric wire end in which conductors of electric wires stacked mutually are compressed from the stack direction and a distal end with a rectangular shape in sectional view is shaped, the mold comprising:
   a pair of molds including a lower metallic mold and an upper metallic mold and provided with shaping grooves having corner portions for shaping angular portions of the distal end;
   wherein corner portions are formed by edges of the shaping grooves by mutually butting the respective molds such that the shaping grooves are aligned;
   wherein a butted position of edges of the shaping groove of the lower metallic mold and the shaping groove of the upper metallic mold is shifted.

\* \* \* \* \*